Oct. 16, 1923.
F. H. CHAPMAN
PIVOT BEARING
Filed Sept. 11, 1922
1,470,665
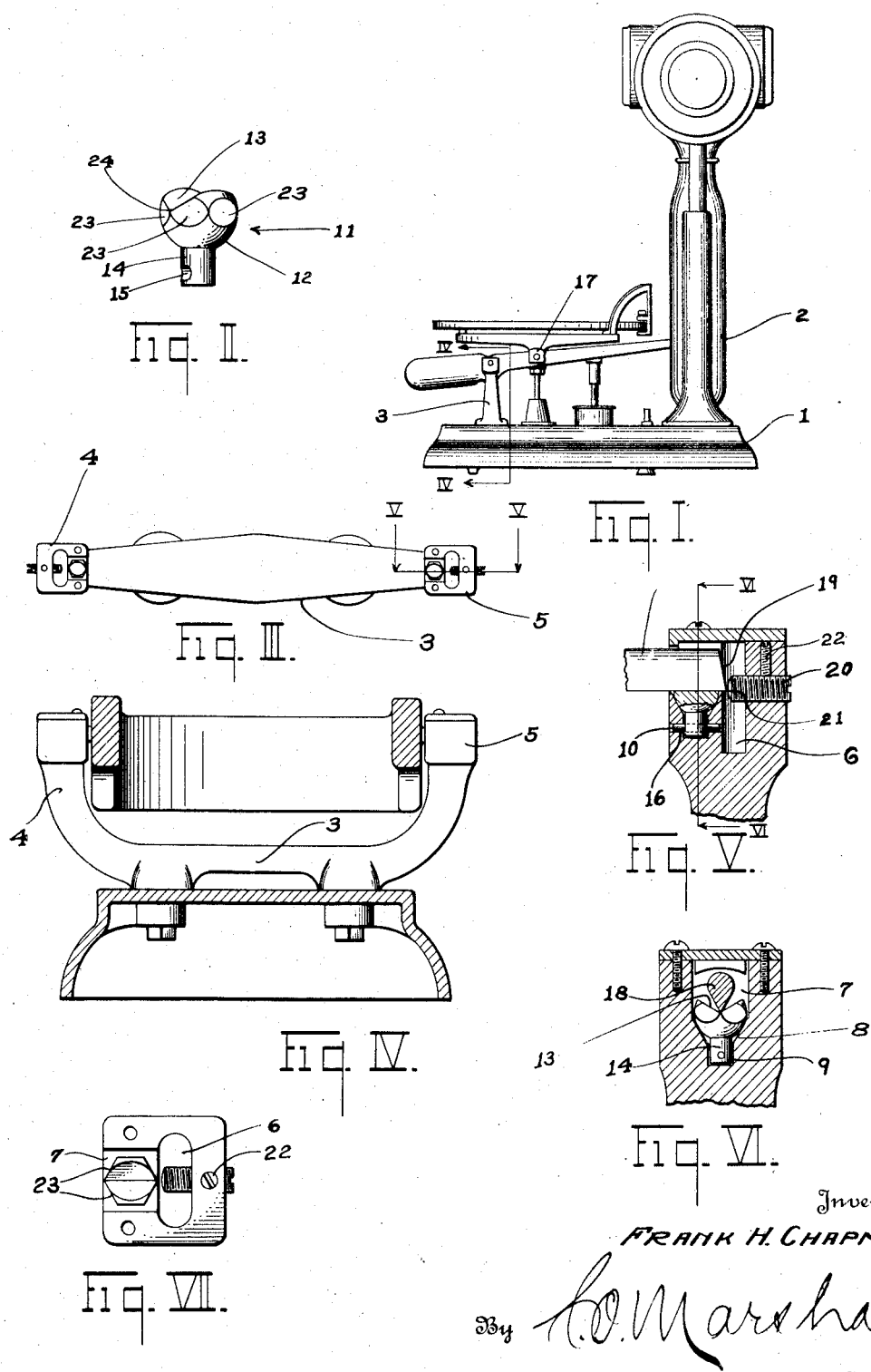
Inventor
FRANK H. CHAPMAN.
By C.O. Marshall.
Attorney Patented Oct. 16, 1923.

1,470,665

UNITED STATES PATENT OFFICE.

FRANK H. CHAPMAN, OF TOLEDO, OHIO, ASSIGNOR TO TOLEDO SCALE COMPANY, OF TOLEDO, OHIO, A CORPORATION OF NEW JERSEY.

PIVOT BEARING.

Application filed September 11, 1922. Serial No. 587,259.

*To all whom it may concern:*

Be it known that I, FRANK H. CHAPMAN, a citizen of the United States, residing at Toledo, in the county of Lucas and State of Ohio, have invented certain new and useful Improvements in Pivot Bearings, of which the following is a specification.

This invention relates to pivot bearings, and one of its principal objects is to provide a bearing having a V-shaped groove adapted to receive a knife edge pivot, the bearing being so mounted that when the knife edge pivot is seated in the groove the bearing automatically takes a position in which the line at the apex of the groove and the line at the edge of the pivot are coincident. With bearings rigidly mounted in one frame and pivots rigidly secured to another, it is almost impossible to secure absolute alignment of the knife edges of the pivots and the apex lines of the bearing grooves, and even when the parts are machined and assembled with the requisite care and skill, rigidly mounted bearings are liable to be thrown out of alignment by subsequent warping of the frames or by deflection when the frames are placed under load. When a pivot and bearing are out of alignment, only a part of the pivot edge engages the bottom of the groove and this part of the pivot edge is subjected to greater pressure and wear than that for which it is designed. If the pivot and bearing be tilted relative to each other to the slightest degree, the portion of the pivot edge engaged in the bearing is liable to be reduced to a very small fraction, and, since the pressure per lineal inch is inversely proportional to the length of the part of the pivot edge which is in contact with the bearing, the pressure per lineal inch is liable to cause the pivot to chip or become excessively worn and thus result in destroying the accuracy of the scale or other device upon which the pivot is employed. When the pivot is improperly engaged with the bearing it is liable to bind and thus introduce inaccuracies.

Another object of the invention is to provide a pivot bearing and mounting therefor in which the bearing, while it is free to position itself with the apex of its groove in alignment with the knife edge of the pivot, is held against translation or bodily shifting movement such as would cause relative displacement of the members to which the pivots and bearings are attached.

Another object is the provision of a bearing and mounting which may be easily, cheaply and accurately made by ordinary machine operations and which may be rapidly assembled by unskilled and inexperienced labor.

Another object is the provision of a bearing and mounting therefor which are so constructed and assembled that the bearings are interchangeable and may be quickly and easily replaced.

Still another object is the provision of a self-aligning bearing which may be made by screw machine operations from commercial stock.

And still another object is to provide a grooved bearing which has the advantages outlined above and which is also formed with end thrust bearings at the ends of its groove.

Other objects and advantages will be apparent from the following description, in which reference is had to the drawings illustrating a preferred embodiment of my invention and wherein similar reference numerals designate similar parts throughout the several views.

In the drawings:—

Figure I is a side elevation of a weighing scale of a well known type having a main lever and a platform spider such as the bearings and mountings of my invention are adapted to support;

Figure II is an enlarged elevational view of a bearing piece forming an element of my invention;

Figure III is a plan view on an enlarged scale of the fulcrum stand which is employed to support the main lever of the scale shown in Figure I;

Figure IV is a vertical sectional view on an enlarged scale, taken substantially on the line IV—IV of Figure I;

Figure V is an enlarged vertical sectional view taken substantially on the line V—V of Figure III;

Figure VI is a vertical sectional view taken on the line VI—VI of Figure V; and

Figure VII is an enlarged top plan view of one of the ends of the fulcrum stands shown in Figure III.

Referring to the drawings in detail, the base 1 of the scale shown in Figure I supports at one end an upright housing 2 which contains the load-offsetting and indicating mechanism (not shown) of the scale.

Supported at the other end of the base 1 is a fulcrum stand 3, having upwardly extending ends 4 and 5, each of which contains the bearing and mounting of my invention. By reference to Figures V, VI and VII it will be seen that the end of the fulcrum stand is provided with an oval recess 6, into one of the walls of which opens a notch 7 that is cut into the upper end 5 of the fulcrum stand. A frusto-conical socket 8 having a cylindrical terminal 9 is formed in the lower side of the notch 7 and the cylindrical terminal of the socket is intersected by a transverse bore 10.

Seated in the frusto-conical socket 8 is a bearing piece 11 having a spherical surface 12 which engages the wall of the socket 8. Since the socket is conical and the engaging part of the bearing piece is spherical, the two parts are in contact along a circular line, and, while the bearing piece may turn in its seat in any direction, the seat is nevertheless firm, regardless of the angle of the cone or the exact location of the conical axis.

The bearing piece 11 is formed with a V-shaped groove 13, the apex line of which passes through the center of curvature and therefore lies along a diameter of the spherical surface 12. It will be understood that when the bearing piece is seated in the socket 8, the apex line of the groove may turn about its center in any direction, but the center of the line must always remain in the same position and the bearing cannot, therefore, shift bodily. A stem 14 is formed upon the lower side of the bearing piece and is loosely received in the cylindrical terminal 9 of the socket 8. The cylindrical terminal 9 being considerably larger than the stem 14, the stem 14 always remains out of contact with the walls of the cylindrical terminal, and such slight movement of the bearing piece in its socket as is necessary to bring the apex of the groove into coincidence with the knife edge of the pivot is not interfered with. The stem 14 is provided with a transverse bore 15 through which is passed a retaining pin 16, the retaining pin being tightly engaged in the bore 15 and loosely received in the bore 10 which intersects the cylindrical terminal 9 of the socket 8. The pin 16 thus serves to prevent the bearing piece 11 from falling out of its socket in case the scale is turned upside down or in case the device is used in an inverted position, as it is on the spider 17 of the scale shown in Figure I.

With the parts assembled as above described, when the knife edge pivot 18 is placed in the groove 13, the bearing piece 11 will be turned to a position in which the knife edge of the pivot lies in contact with the bottom of the groove for its entire length, and if there be any subsequent warping or deflection of the frames to which the pivot and bearing are attached, the bearing piece 11 will turn in its socket to maintain the coincidence of the knife edge of the pivot and the apex line of the bearing groove.

In order to prevent the excessive friction which might be caused by rubbing of the end of the pivot 18 against the end 5 of the fulcrum stand 3, the end of the pivot is mitered, as at 19, so that a point 19 is formed at the end of its knife edge, and the end 5 of the fulcrum stand is provided with a thrust screw 20 which may be adjusted to limit the possible endwise movement of the pivot 18 and then locked in place by a set screw 22. Under some circumstances, however, it is inadvisable to form the thrust bearing at the end of the pivot, and, in order to prevent excessive friction under such circumstances, the bearing piece 11 is formed with flat sides 23, two of which intersect and thus form points 24 at the ends of the groove 13. With this construction, if the pivot should slide longitudinally in the groove, the part to which the pivot was secured would be engaged by one of the points 24 at the end of the groove 13, the point thus forming a substantially frictionless end thrust bearing. By turning the bearing piece 11 out of hexagonal stock, the expense of cutting the intersecting flat surfaces 23 is avoided.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a member having a cone-shaped socket therein, and a bearing piece having a portion of its surface of spherical form resting in said socket, said bearing piece having a V-shaped groove therein, the apex of said groove passing through the center of curvature of said spherical surface.

2. In a device of the class described, in combination, a member having a cone-shaped socket therein, and a bearing piece having a spherical surface resting in said socket and having a V-shaped groove therein, the apex of said groove being coincident with the diameter of said spherical surface.

3. In a device of the class described, in combination, a member having knife edge pivots fixed thereto, a member having cone-shaped sockets therein, and bearing pieces with substantially spherical surfaces positioned in said sockets, said bearing members having V-shaped grooves, the apices of which are substantially coincident with the diameters of the spherical surfaces, said knife edge pivots being received in said grooves.

4. In a device of the class described, in combination, a member having knife edge pivots fixed thereto, a member having cone-shaped sockets therein, bearing pieces with substantially spherical surfaces positioned in said sockets, said bearing members having V-shaped grooves, the apices of which are substantially coincident with the diameters of the spherical surfaces, said knife edge pivots being received in said grooves, and means for limiting the movement of said bearing pieces.

5. In a device of the class described, in combination, a member having a knife edge pivot, a member having a cone-shaped socket, and a bearing piece having a substantially spherical surface and a V-shaped groove, said knife edge pivot lying within said V-shaped groove, the spherical surface of the bearing piece engaging the cone of the cone-shaped socket whereby the bearing piece and knife edge pivot are permitted to engage along the apex line of the groove.

6. In a device of the class described, in combination, a member having a cone-shaped socket, a bearing piece having a substantially spherical surface engaging said cone-shaped socket along a circular line, said bearing piece having a V-shaped groove therein, the apex line of said groove lying along a diameter of said spherical surface, and a member having a knife edge pivot, said knife edge pivot being engaged in said groove.

7. In a device of the class described, in combination, a member having a frusto-conical socket therein, said socket having a substantially cylindrical terminal, and a bearing piece having a spherical surface engaging said frusto-conical socket about a circular line and having a stem loosely received in said cylindrical terminal.

8. In a device of the class described, in combination, a member having a frusto-conical socket therein, said socket having a substantially cylindrical terminal, and a bearing piece having a spherical surface engaging said frusto-conical socket about a circular line and having a stem loosely received in said cylindrical terminal, said member having a bore intersecting said cylindrical terminal, and said bearing piece having a pin projecting from its stem and loosely received in said bore.

9. In a device of the class described, in combination, a lever having knife edge pivots, a support for the pivots of said lever comprising uprights having cone-shaped sockets with cylindrical terminals, and bearing pieces having substantially spherical surfaces received in said cone-shaped sockets, said bearing pieces having stems loosely received in said cylindrical terminals and having V-shaped grooves receiving said knife edge pivots.

10. In a device of the class described, in combination, a lever having knife edge pivots, a support for the pivots of said lever comprising uprights having cone-shaped sockets with cylindrical terminals, bearing pieces having substantially spherical surfaces received in said cone-shaped sockets, said bearing pieces having stems loosely received in said cylindrical terminals and having V-shaped grooves receiving said knife edge pivots, and means for retaining the bearing pieces in their sockets.

11. A bearing piece having a portion of its surface of spherical form, said bearing piece having a V-shaped groove, the apex of which lies along a diameter of said spherical surface, and a stem extending from said bearing piece and having its axis substantially perpendicular to the apex of said groove.

12. A bearing piece having a portion of its surface of spherical form, said bearing piece having a V-shaped groove, the apex of which lies along a diameter of said spherical surface, and a stem extending from said bearing piece and having its axis substantially perpendicular to the apex of said groove, said bearing piece having flat surfaces intersecting and thereby forming points at the ends of said groove.

13. A bearing piece having a portion of its surface of spherical form, said bearing piece having a V-shaped groove, the apex of which lies along a diameter of said spherical surface, and a polygonal-shaped portion, two sides of which intersect at an end of said groove.

14. A bearing piece having a portion of its surface of spherical form, said bearing piece having a V-shaped groove, the apex of which lies along a diameter of said spherical surface, a polygonal-shaped portion, two sides of which intersect at an end of said groove, and a stem extending radially from said spherical surface.

FRANK H. CHAPMAN.

Witnesses:
FRANCES DOYLE,
H. O. ERNSBERGER.